United States Patent
Chien

(10) Patent No.: US 10,656,450 B2
(45) Date of Patent: May 19, 2020

(54) LIQUID CRYSTAL DISPLAY MODULE AND METHOD FOR MANUFACTURING THE SAME

(71) Applicants: HKC CORPORATION LIMITED, Guangdong (CN); CHONGQING HKC OPTOELECTRONICS TECHNOLOGY CO., LTD., Chongqing (CN)

(72) Inventor: Chung-kuang Chien, Taiwan (CN)

(73) Assignees: HKC CORPORATION LIMITED, Guangdon (CN); CHONGQING HKC OPTOELECTRONICS TECHNOLOGY CO. LTD., Chongqing (CN)

( * ) Notice: Subject to any disclaimer, the term of this patent is extended or adjusted under 35 U.S.C. 154(b) by 0 days.

(21) Appl. No.: 15/556,532

(22) PCT Filed: May 26, 2017

(86) PCT No.: PCT/CN2017/086161
§ 371 (c)(1),
(2) Date: Sep. 7, 2017

(87) PCT Pub. No.: WO2018/209731
PCT Pub. Date: Nov. 22, 2018

(65) Prior Publication Data
US 2020/0004079 A1    Jan. 2, 2020

(30) Foreign Application Priority Data

May 19, 2017 (CN) .......................... 2017 1 0358224

(51) Int. Cl.
*G02F 1/1333* (2006.01)
*G02F 1/1339* (2006.01)
(Continued)

(52) U.S. Cl.
CPC .......... *G02F 1/133351* (2013.01); *C09J 9/00* (2013.01); *G02F 1/1337* (2013.01); *G02F 1/13394* (2013.01); *G02F 2001/13415* (2013.01)

(58) Field of Classification Search
CPC ............. G02F 1/133351; G02F 1/1337; G02F 1/1339; G02F 1/133788; G02F 1/1368;
(Continued)

(56) References Cited

U.S. PATENT DOCUMENTS 8,724,073 B2    5/2014 Woo et al.
2007/0095468 A1*  5/2007 Kim ...................... B29C 48/155
                                                      156/275.3

FOREIGN PATENT DOCUMENTS

CN        101285969      10/2008
CN        102736302      10/2012
(Continued)

OTHER PUBLICATIONS

International Search Report and Written Opinion Form PCT/ISA/220 and PCT/ISA/237, International Application No. PCT/CN2017/086161, pp. 1-5, International Filing Date May 26, 2017, dated Feb. 23, 2018.

*Primary Examiner* — Thoi V Duong
(74) *Attorney, Agent, or Firm* — Bond Schoeneck & King, PLLC; George McGuire

(57) ABSTRACT

Provided is a method for manufacturing a liquid crystal display module, including: pre-baking a first substrate and a second substrate; disposing sealing glue at edges of the first substrate and edges of the second substrate; dropping liquid crystals on the second substrate, and coating frame glue on the first substrate and the second substrate; assembling the first substrate and the second substrate so as to form at least
(Continued)

one liquid crystal display module, and irradiating the liquid crystal display module with a first light source.

19 Claims, 3 Drawing Sheets

(51) Int. Cl.
    *C09J 9/00*            (2006.01)
    *G02F 1/1337*        (2006.01)
    *G02F 1/1341*        (2006.01)

(58) Field of Classification Search
    CPC .................. G02F 1/13; G02F 1/133711; G02F
              1/133723; G02F 1/133514; G02F 1/1343;
              G02F 1/1362; G02F 1/1333; G02F
            2001/13415; G02F 2202/28; C09J 163/00;
              C09J 2205/31; C09J 5/00; C09J 9/00
    See application file for complete search history.

(56) References Cited

FOREIGN PATENT DOCUMENTS

| | | |
|---|---|---|
| CN | 103487996 | 1/2014 |
| CN | 104865723 | 8/2015 |
| CN | 106597757 | 4/2017 |

\* cited by examiner

LIQUID CRYSTAL DISPLAY MODULE AND METHOD FOR MANUFACTURING THE SAME

CROSS-REFERENCE TO RELATED APPLICATIONS

This application is the United States National Stage Application under 35 U.S.C. 371 of PCT/CN2017/086161 filed on May 26, 2017, which claims priority Chinese patent application No. 201710358224.3, filed on May 19, 2017, the entire disclosure of each of which is incorporated herein by reference.

TECHNICAL FIELD

The present disclosure relates to the field of liquid crystal display and more particularly to a liquid crystal display module and a method for making the same.

BACKGROUND

In the manufacturing process of a conventional liquid display module, it is very difficult to harden frame glue. Therefore, pre-baking, frame glue UV (ultraviolet) hardening and frame glue baking hardening and other baking hardening treatments are required so as to harden the frame glue. The operation process is complex and the UV irradiation time must be significantly prolonged, causing an overlong processing time. In addition, multiple devices are required, resulting in an over high manufacturing cost.

SUMMARY

In view of this, it is necessary to provide a liquid crystal display module and a user-friendly and cost-effective method for manufacturing the same.

A method for manufacturing the liquid crystal display module includes the following steps:

pre-baking a first substrate and a second substrate;

forming a sealing glue at edges of the first substrate and edges of the second substrate;

dropping liquid crystals on the second substrate, and coating a frame glue on the first substrate and the second substrate;

assembling the first substrate and the second substrate coated with the frame glue, and forming the liquid crystals in a gap between the first substrate and the second substrate after the first substrate and the second substrate have been assembled so as to form at least one liquid crystal display module;

irradiating the liquid crystal display module with a first light source; and irradiating the liquid crystal display module with a second light source.

In an embodiment, after the step of irradiating the liquid crystal display module with the second light source, the method further includes:

detecting flaws on the liquid crystal display module.

In an embodiment, a wavelength of an absorption spectrum of the sealing glue is 300 nm to 400 nm.

In an embodiment, the step of assembling the first substrate and the second substrate coated with the frame glue includes:

arranging an alignment film between the first substrate and the second substrate; and sequentially stacking the first substrate, the alignment film, the liquid crystals and the second substrate, and adhering with the sealing glue the edges of the first substrate and the edges of the second substrate.

In an embodiment, the method further includes arranging electrodes at two opposite sides of the second substrate.

In an embodiment, the method further includes arranging black matrixes at positions, opposite to the electrodes, of the first substrate.

In an embodiment, after connected to an electrode plate of a power source, the liquid crystals are aligned by the alignment film.

In an embodiment, the first substrate is a color filter substrate.

In an embodiment, the second substrate is a thin film transistor substrate.

Further, a liquid crystal display module is provided.

The liquid crystal display module includes a first substrate and a second substrate, and further includes sealing glue.

The second substrate, the alignment film, the liquid crystals and the first substrate are sequentially stacked. The sealing glue adheres edges of the first substrate and further adheres edges of the second substrate. A position adhered with the sealing glue on the first substrate is fixed to a position adhered with the sealing glue on the second substrate. A wavelength of an absorption spectrum of the sealing glue is 300 nm to 400 nm.

According to the method for manufacturing the liquid crystal display module and the liquid crystal display module, the first substrate and the second substrate are pre-baked; the sealing glue is disposed at edges of the first substrate and edges of the second substrate; the liquid crystals are dropped on the second substrate; the first substrate and the second substrate are coated with the frame glue; the first substrate and the second substrate are assembled to form at least one liquid crystal display module; and then the liquid crystal display module is irradiated by the first light source and the second light source.

Since the wavelength of an absorption spectrum of the sealing glue between the first substrate and the second substrate is 300 nm to 400 nm, the sealing glue can be well cured after having been irradiated by the first light source and the second light source, and a UV coating curing device and a coating baking device are not needed. Thus, the manufacturing of the liquid crystal display module is simplified and the cost is saved. Meanwhile, the liquid crystal display module is irradiated by the visible light and the UV light, thereby expediting curing of the UV glue and thus reducing the manufacturing time and increasing the manufacturing efficiency.

DETAILED DESCRIPTION

To facilitate understanding of the present disclosure, the present disclosure will be described more fully hereinafter with reference to relevant accompanying drawings. Preferred embodiments of the present disclosure are provided in the accompanying drawings. However, the present disclosure may be embodied in many different forms and is not limited to the embodiments described herein. Conversely, the purpose of providing these embodiments is to enable a thorough understanding of the present disclosure.

Unless otherwise defined, all technical and scientific terms used herein are the same as those commonly understood by those skilled in the art to which this disclosure pertains. The terminology in the specification of the present disclosure is only used for describing particular embodiments and is not intended to limit the present disclosure. The term "and/or" used herein includes any and all combinations of one or more of the associated listed items.

Figure 1:
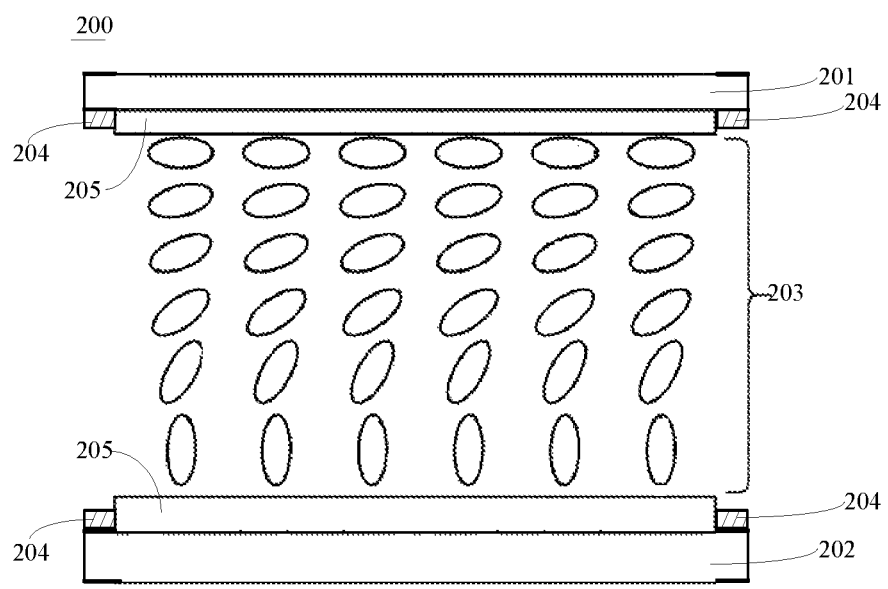
FIG. 1 is a sectional view of a liquid crystal display module.

Please refer to FIG. 1.

A liquid crystal display module 200 includes a first substrate 201 (for example, a color filter substrate), a second substrate 202 (for example, a thin film transistor substrate) and sealing glue 204.

The second substrate 202, liquid crystals 203, an alignment film 205 and the first substrate 201 are arranged in a stacked manner. The sealing glue 204 is used to adhere edges of the first substrate 201. The sealing glue 204 is also used to adhere edges of the second substrate 202. A position adhered with the sealing glue 204 on the first substrate 201 and a position adhered with the sealing glue 204 on the second substrate 202 are fixed. A wavelength of an absorption spectrum of the sealing glue 203 is 300 nm to 400 nm.

Figure 2:
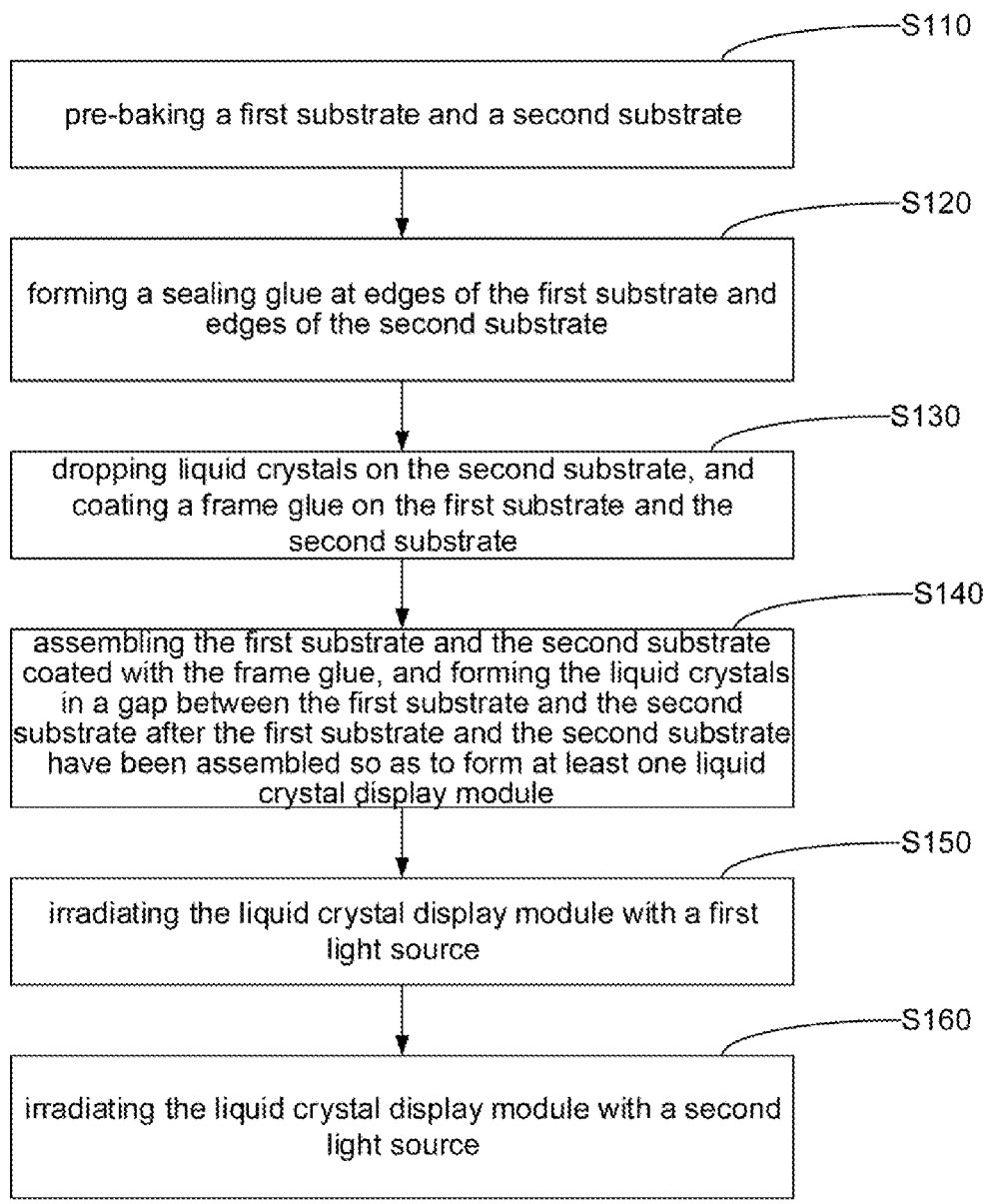
FIG. 2 is a flowchart of a method for manufacturing a liquid crystal display module.

FIG. 2 is a flowchart of a method for manufacturing a liquid crystal display module.

The method for manufacturing the liquid crystal display module includes steps S110 to S160.

In step S110, the first substrate 201 and the second substrate 202 are pre-baked.

Before being adhered, the first substrate 201 and the second substrate 202 need to be pre-baked for removing water vapor remaining on the first substrate 201 and the second substrate 202. The first substrate 201 and the second substrate 202 are pre-heated for facilitating subsequent operations.

In step S120, the sealing glue 204 is formed at edges of the first substrate 201 and edges of the second substrate 202. The wavelength of the absorption spectrum of the sealing glue 203 is 300 nm to 400 nm.

The liquid crystals 203 need to be dropped between the first substrate 201 and the second substrate 202. Therefore, edges of the first substrate 201 and edges of the second substrate 202 need to be adhered with frame glue, whose curing process, however, generally includes baking, UV irradiation, re-baking and so on.

In the present embodiment, the sealing glue 204 is used as frame glue to adhere edges of the first substrate 201 and edges of the second substrate 202. The sealing glue 204 has an absorption spectrum wavelength of 300 nm to 400 nm which is close to the wavelength of the ultraviolet light. Therefore, the sealing glue 204 can be rapidly hardened after irradiation by ultraviolet light. Optionally, the wavelength of the absorption spectrum of the sealing glue 204 is 300 nm to 400 nm.

In step S130, the liquid crystals 203 are dropped on the second substrate 202, and the first substrate 201 and the second substrate 202 are coated with frame glue.

The liquid crystals 203 are provided between the first substrate 201 and the second substrate 202. The liquid crystals 203 are disposed between the first substrate 201 and the second substrate 202 in a dropping manner. Liquid crystals 203 are in a state between liquid and crystals, and have unique properties in addition to some of the properties (such as liquidity and anisotropy) of liquid and crystals.

Meanwhile, blank areas of the first substrate 201 and the second substrate 202 are also coated with the frame glue.

In step S140, the first substrate 201 and the second substrate 202 coated with the frame glue are assembled, and the liquid crystals 203 are arranged in a gap between the first substrate 201 and the second substrate 202 after the first substrate 201 and the second substrate 202 have been assembled so as to form at least one liquid crystal display module 200.

Specifically, the step of assembling the first substrate 201 and the second substrate 202 coated with the frame glue includes:

An alignment film 205 is arranged between the first substrate 201 and the second substrate 202.

The first substrate 201, the alignment film 205, the liquid crystals 203 and the second substrate 202 are sequentially stacked, and edges of the first substrate 201 and edges of the second substrate 202 are adhered by means of the sealing glue 204.

After the sealing glue 204, the liquid crystals 203 and the coating of the frame glue are arranged, the first substrate 201 and the second substrate 202 need to be assembled. That is, substrate assembling is required. Meanwhile, it should be ensured that the liquid crystals 203 are located between the first substrate 201 and the second substrate 202.

In step S150, the liquid crystal display module 200 is irradiated with a first light source 206. The first light source 206 may be visible light, and the irradiation time of the visible light is 50-70 s.

Irradiating the liquid crystal display module 200 by the visible light can expedite the hardening of UV curing glue which is adhered between the first substrate 201 and the second substrate 202, thereby making the first substrate 201 and the second substrate 202 tightly bonded. Optionally, the irradiation time of the visible light is 60 s.

In step S160, the liquid crystal display module 200 is irradiated with a second light source 207. The second light source 207 may be ultraviolet light, and the irradiation time of the ultraviolet light is 90-110 s.

The first substrate 201 and the second substrate 202 are irradiated with the ultraviolet light, so that the UV curing glue which is adhered between the first substrate 201 and the second substrate 202 is rapidly hardened, thereby making the first substrate 201 and the second substrate 202 tightly adhered.

Visible light irradiation and ultraviolet light irradiation are adopted respectively. Since visible light irradiation can expedite the hardening of the UV curing glue, the hardening time of the UV curing glue is remarkably reduced and the manufacturing efficiency is improved.

In the present embodiment, the sequence of step S150 and step S160 does not affect the final molding state of the liquid crystal display module 200. Therefore, step S150 and step S160 can be performed in an arbitrary sequence or at the same time.

After the step S160, the method for manufacturing the liquid crystal display module also includes:

detecting flaws on the first substrate 201 and the second substrate 202.

After the adhering of the first substrate 201 and the second substrate 202 is completed, detection is needed to determine whether or not the surfaces of the first substrate 201 and the second substrate 202 have obvious flaws, for example, large gaps arising from scratches, bumps, or adhesion.

The method for manufacturing the liquid crystal display module also includes arranging electrodes at two opposite sides of the second substrate 202.

The method for manufacturing the liquid crystal display module also includes arranging black matrixes at positions, opposite to the electrodes, of the first substrate 201.

According to all the above-described embodiments, the first substrate 201 and the second substrate 202 are adhered with each other by the sealing glue 204 whose absorption spectrum wavelength is close to the ultraviolet wavelength. Therefore, when the first substrate 201 and the second substrate 202 are irradiated during the time the power source is connected to and the liquid crystals 203 are aligned, the sealing glue 204 can be quickly hardened without using a UV frame glue hardening machine or a frame glue baking hardening machine, thereby simplifying the method for manufacturing the liquid crystal display module and thus saving costs.

According to all the above embodiments, the first substrate 201 is a color filter substrate, and the second substrate 202 is a thin film transistor substrate.

Figure 3:
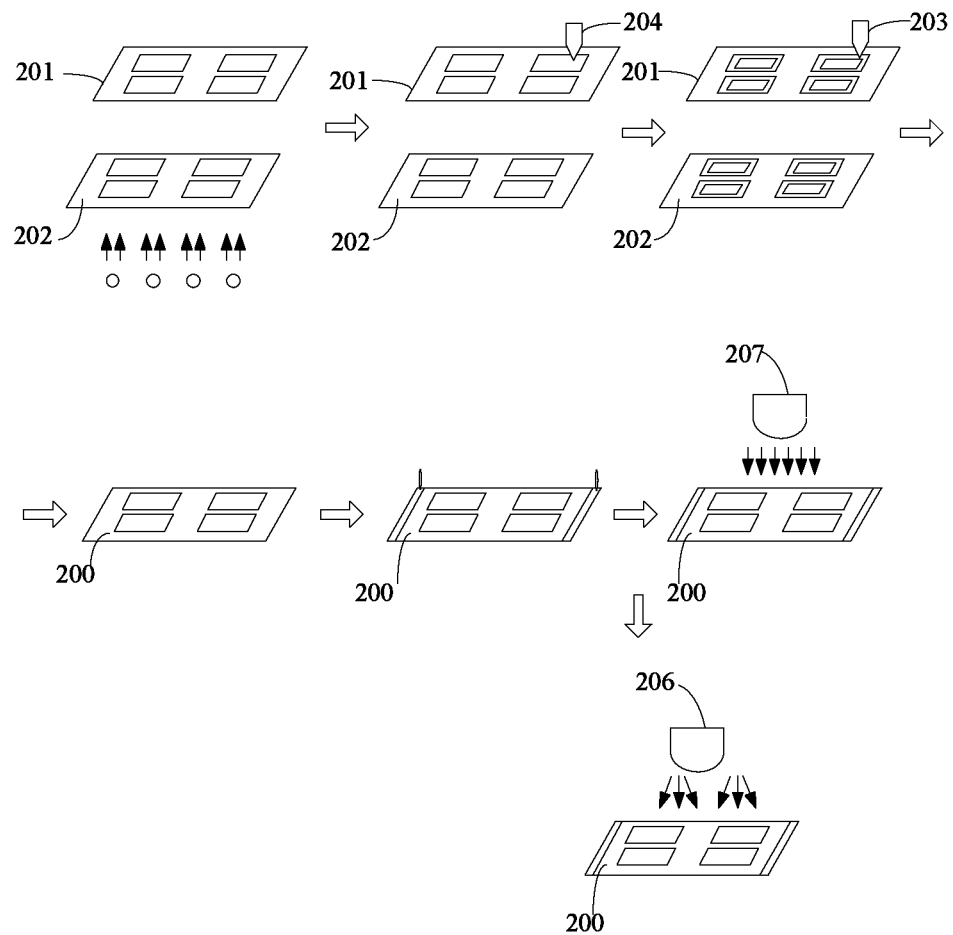
FIG. 3 is a schematic view showing the method for manufacturing the liquid crystal display module.

Please refer to FIG. 3.

The working principle of the method for manufacturing the liquid crystal display module is as follows: performing basic processing including pre-baking the first substrate 201 and the second substrate 202, arranging the sealing glue 204, dropping the liquid crystals 203 on the second substrate 202, and then coating the frame glue; and after the basic processing is completed, assembling the first substrate 201 and the second substrate 202, including assembling the first substrate 201 and the second substrate 202 to form at least one liquid crystal display module 200, cutting edges of the liquid crystal display module 200, and then irradiating the liquid crystal display module 200 with the first light source 206 and the second light source 207.

According to the above method for manufacturing the liquid crystal display module and the liquid crystal display module, the first substrate 201 and the second substrate 202 are pre-baked, and then the sealing glue 204 is disposed at edges of the first substrate 201 and the second substrate 202. The liquid crystals 203 are dropped on the second substrate 202, the first substrate 201 and the second substrate 202 are coated with the frame glue, and then the first substrate 201 and the second substrate 202 are assembled to form at least one liquid crystal display module 200. The liquid crystal display module 200 is irradiated with the first light source 206 and the second light source 207. The absorption spectrum wavelength of the sealing glue 204 between the first substrate 201 and the second substrate 202 is 300 nm to 400 nm, and therefore, after having been irradiated by the first light source 206 and the second light source 207, the sealing glue 204 can be well cured without using the UV coating curing device or the coating baking device, thereby simplifying the manufacturing of the liquid crystal display module 200 and thus saving costs. Meanwhile, irradiation of the first light source 206 and the second light source 207 can expedite the hardening of the UV curing glue, thereby reducing the manufacturing time and improving the manufacturing efficiency.

An embodiment of the present disclosure also provides a method for manufacturing a liquid crystal display module. The method includes: prebaking a first substrate and a second substrate are pre-baked; arranging a first sealing glue at edges of the first substrate and a second sealing glue at edges of the second substrate, where the first sealing glue and the second sealing glue have a same shape; disposing liquid crystals in a region defined by the second sealing glue on the second substrate; coating frame glue on the first substrate and the second substrate; arranging the first substrate on the first substrate so that the first sealing glue and the second sealing glue are aligned and in contact; irradiating the first sealing glue and the second sealing glue with a first light source; and irradiating the first sealing glue and the second sealing glue with a second light source.

Optionally, the second light source is configured to provide ultraviolet light, and the irradiation time of the second light source is 90s to 110s.

Optionally, the wavelength of an absorption spectrum of the sealing glue is 300 nm to 400 nm.

Optionally, before arranging the first substrate on the second substrate so that the first sealing glue and the second sealing glue are aligned and in contact, the method further includes: arranging an alignment film between the first substrate and the second substrate.

The technical features of all the above embodiments can be arbitrarily combined. For the sake of making the descriptions concise, not all possible combinations of the various technical features in the above embodiments are described. However, as long as there is no contradiction in combining these technical features, these combinations should be considered within the scope of this disclosure.

All the above-described embodiments are merely illustrative of several embodiments of the present disclosure. These embodiments are described in detail, but are not to be construed as limiting the scope of the disclosure. It should be noted that various modifications and improvements can be made by those skilled in the art without departing from the spirit of this disclosure, all of which are within the scope of the present disclosure. Accordingly, the scope of the present disclosure is intended to be within the scope of the appended claims.

What is claimed is:

1. A method for manufacturing a liquid crystal display module, comprising:
   pre-baking a first substrate and a second substrate;
   forming a sealing glue at edges of the first substrate and edges of the second substrate;
   dropping liquid crystals on the second substrate, and coating a frame glue on the first substrate and the second substrate;
   assembling the first substrate and the second substrate coated with the frame glue, and forming the liquid crystals in a gap between the first substrate and the second substrate after the first substrate and the second substrate have been assembled so as to form at least one liquid crystal display module;
   irradiating the liquid crystal display module with a first light source; and
   irradiating the liquid crystal display module with a second light source.

2. The method for manufacturing the liquid crystal display module according to claim 1, wherein after irradiating the liquid crystal display module with the second light source, the method further comprises: detecting flaws on the liquid crystal display module.

3. The method for manufacturing the liquid crystal display module according to claim 1, wherein a wavelength of an absorption spectrum of the sealing glue is 300 nm to 400 nm.

4. The method for manufacturing the liquid crystal display module according to claim 1, wherein the step of assembling the first substrate and the second substrate coated with the frame glue comprises:
   arranging an alignment film between the first substrate and the second substrate;
   sequentially stacking the first substrate, the alignment film, the liquid crystals and the second substrate, and adhering with the sealing glue the edges of the first substrate and the edges of the second substrate.

5. The method for manufacturing the liquid crystal display module according to claim 4, further comprising: arranging electrodes at two opposite sides of the second substrate separately.

6. The method for manufacturing the liquid crystal display module according to claim 5, further comprising: arranging black matrixes at positions, opposite to the electrodes, of the first substrate.

7. The method for manufacturing the liquid crystal display module according to claim 4, wherein after connected to an electrode plate of a power source, the liquid crystals are aligned by the alignment film.

8. The method for manufacturing the liquid crystal display module according to claim 1, wherein the first substrate is a color filter substrate.

9. The method for manufacturing the liquid crystal display module according to claim 1, wherein the second substrate is a thin film transistor substrate.

10. The method for manufacturing the liquid crystal display module according to claim 1, wherein the first light source is configured to provide visible light.

11. The method for manufacturing the liquid crystal display module according to claim 10, wherein an irradiation time of the first light source is 50-70s.

12. The method for manufacturing the liquid crystal display module according to claim 10, wherein an irradiation time of the first light source is 60s.

13. The method for manufacturing the liquid crystal display module according to claim 1, wherein the second light source is configured to provide ultraviolet light.

14. The method for manufacturing the liquid crystal display module according to claim 13, wherein an irradiation time of the second light source is 90-110s.

15. The method for manufacturing the liquid crystal display module according to claim 1, wherein a wavelength of an absorption spectrum of the sealing glue is 300 nm to 340 nm.

16. A method for manufacturing a liquid crystal display module, comprising:
    pre-baking a first substrate and a second substrate;
    disposing first sealing glue at edges of the first substrate and disposing a second sealing glue at edges of the second substrate, wherein the first sealing glue and the second sealing glue have a same shape;
    dropping the liquid crystals in a region defined by the second sealing glue on the second substrate;
    coating frame glue on the first substrate and the second substrate;
    arranging the first substrate on the second substrate so that the first sealing glue and the second sealing glue are aligned and in contact;
    irradiating the first sealing glue and the second sealing glue with a first light source; and
    irradiating the first sealing glue and the second sealing glue with a second light source.

17. The method for manufacturing the liquid crystal display module according to claim 16, wherein the second light source is configured to provide ultraviolet light, and an irradiation time of the second light source is 90-110s.

18. The method for manufacturing the liquid crystal display module according to claim 16, wherein a wavelength of an absorption spectrum of the sealing glue is 300 nm to 400 nm.

19. The method for manufacturing the liquid crystal display module according to claim 16, wherein before arranging the first substrate on the second substrate so that the first sealing glue and the second sealing glue are aligned and in contact, the method further comprises: arranging an alignment film between the first substrate and the second substrate.

* * * * *